(12) United States Patent
Orton

(10) Patent No.: US 6,470,681 B1
(45) Date of Patent: Oct. 29, 2002

(54) SUPERCHARGED OR TURBOCHARGED ENGINE HAVING AMBIENT AIR INTAKE PORT AND CHARGED AIR INTAKE PORT

(76) Inventor: Kevin Orton, 257 Avenida Lobeiro, Unit G, San Clemente, CA (US) 92672

(*) Notice: Subject to any disclaimer, the term of this patent is extended or adjusted under 35 U.S.C. 154(b) by 0 days.

(21) Appl. No.: 10/035,275

(22) Filed: Jan. 3, 2002

(51) Int. Cl.[7] .............................................. F02B 33/44
(52) U.S. Cl. ...................... 60/605.1; 123/432; 123/559.1
(58) Field of Search ................................. 60/602, 605.1, 60/600, 611; 123/559.1, 432

(56) References Cited

U.S. PATENT DOCUMENTS

| | | | |
|---|---|---|---|
| 4,164,205 A | 8/1979 | Asonomi et al. | 123/117 |
| 4,246,874 A | 1/1981 | Nakagawa et al. | 123/308 |
| 4,318,273 A | 3/1982 | Nohira et al. | 60/611 |
| 4,392,472 A | 7/1983 | Merritt et al. | 123/564 |
| 4,473,055 A | 9/1984 | Ito et al. | 123/564 |
| 4,488,531 A | 12/1984 | Tadokoro et al. | 123/559 |
| 4,617,896 A | 10/1986 | Yoshikawa | 123/432 |
| 4,627,400 A * | 12/1986 | Takata et al. | 123/432 |
| 4,726,343 A | 2/1988 | Kruger | 123/432 |
| 4,753,198 A | 6/1988 | Heath | 123/51 AA |
| 4,870,822 A | 10/1989 | Kamimaru | 60/600 |
| 5,005,359 A | 4/1991 | Tashima et al. | 60/600 |
| 5,020,327 A | 6/1991 | Tashima et al. | 60/600 |
| 5,094,210 A * | 3/1992 | Endres et al. | 123/432 |
| 5,228,422 A | 7/1993 | Wakeman | 123/432 |

* cited by examiner

*Primary Examiner*—Hoang Nguyen
(74) *Attorney, Agent, or Firm*—Calif Tervo

(57) ABSTRACT

An internal combustion engine 10 includes a supercharger 64 and an air supply system 40 including dual intake ports, aspirated air intake port 55 and charged air intake port 75. A piston 18 moveable in an engine cylinder 12 varies the volume of a combustion chamber 17. An exhaust system 80 removes combustion gases 99 from cylinder 12. Aspirated air induction is ceased when the piston displacement reaches approximately 75%–93% of maximum piston displacement. Charged air induction begins as aspirated air induction ceases and continues until piston 18 compresses the inducted air.

20 Claims, 1 Drawing Sheet

SUPERCHARGED OR TURBOCHARGED ENGINE HAVING AMBIENT AIR INTAKE PORT AND CHARGED AIR INTAKE PORT

FIELD OF THE INVENTION

This invention relates in general to a boosted air engine, for example a supercharged or turbocharged engine, and, more specifically to an engine having both an ambient air induction port and a charged air induction port.

BACKGROUND OF THE INVENTION

Supercharged, that is, boosted air engines induct air at greater than ambient pressures into the combustion chamber to deliver a greater amount of air-fuel mixture to the engine and thus provide more power for a given engine size and speed. Typically engines are supercharged by use of a turbocharger or a mechanical supercharger. A turbocharger uses exhaust gasses to drive a turbine that, in turn, drives an air compressor. Turbochargers can both increase power and mileage. A typical mechanical supercharger is belt-driven by the engine crankshaft and is of a displacement blower type that produces a constant displacement of charged air with a given engine speed. Typically, superchargers boost air by 8–16 psi.

Most conventional boosted-air engines rely solely on boost air induction. The disadvantages of this are discussed in the prior art, the most common of which is the low efficiencies from turbochargers at low engine speeds and the slow response time to spool up the turbine to achieve maximum power. A conventional turbocharger relies on exhaust gas expanding to about 120% intake gas volume to power the turbocharger. With efficiency and pumping losses, there is little power left over to spool up the turbocharger and get the engine to speed up quickly.

Therefore, there has been a need for an improved supercharged engine, particularly one that takes advantage of normally aspirated air so that only the boost air portion need be supplied so as to reduce the work required by the supercharger.

DETAILED DESCRIPTION OF THE INVENTION

Figures 1, 2:
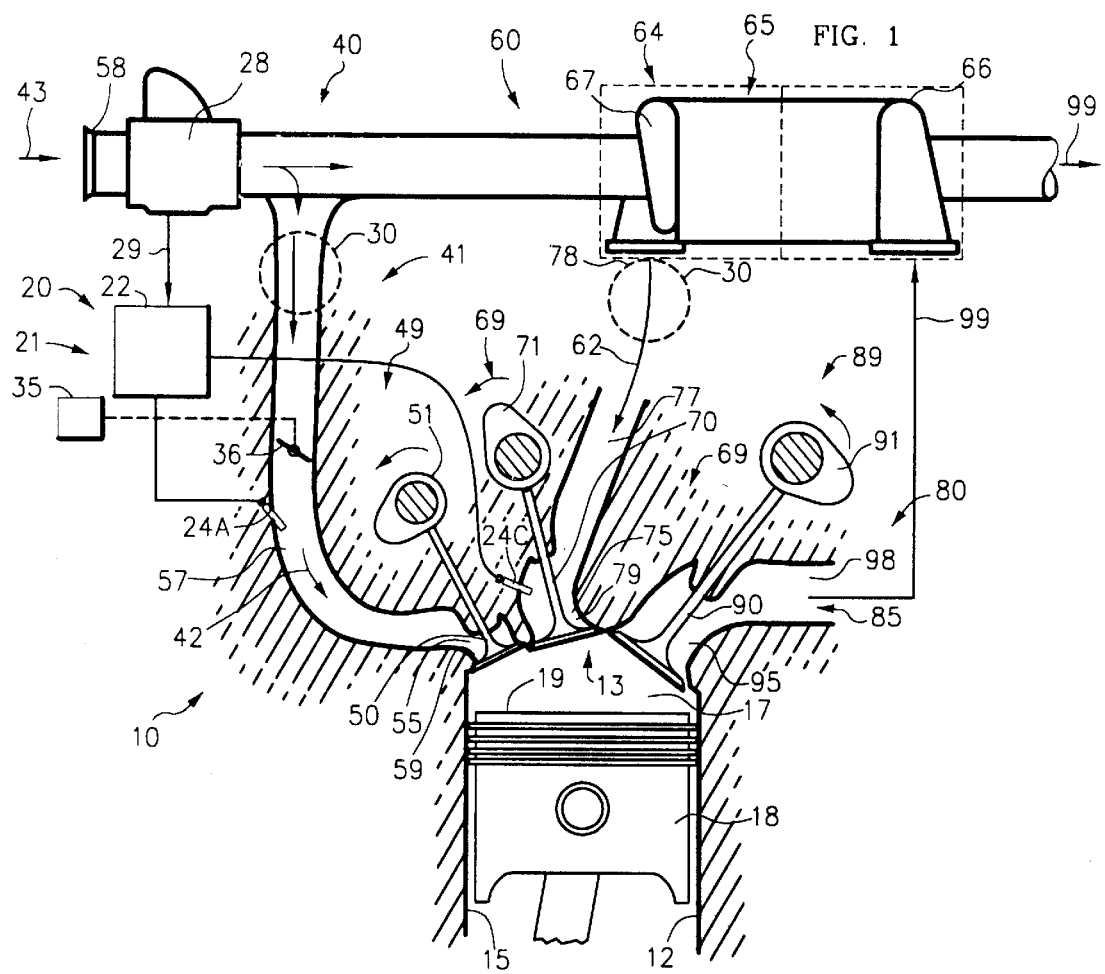
FIG. 1 is a diagram depicting a preferred embodiment of a supercharged internal combustion engine, shown partially in section, having dual inlet ports of the invention.
FIG. 2 is a graph depicting a preferred embodiment of the positions of the exhaust valve, aspirated air intake valve, and charged air intake valves relative to position of the piston.

With reference to the drawings, FIG. 1 is a diagram depicting a preferred embodiment of a supercharged internal combustion engine 10, shown partially in section, having a combustion air supply system 40 including an aspirated input port 55 and a charged input port 75.

Engine 10 includes a cylinder 12 having a head 13 and a side wall 15 and having a piston 18 therein. Part of the volume of cylinder 12 is a combustion chamber 17. Combustion chamber 17 is located between the top side 19 of piston 18 and cylinder head 13. Piston 18 is movable in cylinder 12 so as to vary the volume of combustion chamber 17. Three ports are located in cylinder head 13: a naturally aspirated air intake port 55 that is adapted to be selectively opened and closed, such as by an aspirated air valve 50; a charged air intake port 75 that is adapted to be selectively opened and closed, such as by a charged air valve 70; and an exhaust port 95 that is adapted to be selectively opened and closed by exhaust valve 90.

In the preferred embodiment shown, a turbocharged, single cylinder, reciprocating piston engine 10 is shown. However, as this description is read, it should be appreciated that the system of the present invention is readily adaptable to other types of engines, such as rotary engines and multiple cylinder engines. Also, although valves of conventional nature and located in the cylinder head are shown and described, it should be understood that the invention is not so limited, and the valving could be performed in other manners, such as by rotary valves or reed valves or by using the piston as a valve to open and close ports in cylinder 12, such as in the side wall 15. Additionally, although a turbocharger 65 is shown and described, the invention is also adaptable for use with a supercharger.

A fuel supply system 20, such as computer controlled fuel injection system 21 or, alternatively, carburetors 30, shown in phantom, supplies fuel to combustion chamber 17 by introducing fuel into inducted air 42, 62. Alternatively, fuel could be injected directly into combustion chamber 17. Computer controlled fuel injection system 21 includes a controller 22 that injects fuel from aspirated air fuel injector 24A and charged air fuel injector 24C responsive to air flow signal 29 from air flow meter 28.

An exhaust system 80 removes exhaust gases from cylinder 12. Exhaust system 80 includes exhaust port 95 for receiving combusted gasses from cylinder 12, valve means 89 for opening and closing port 95 and exhaust passage 98 for conducting combusted gasses away from exhaust port 95. Valve means 89 includes exhaust valve 90 and means, such as exhaust cam 91, for operating valve 90. Exhaust passage 98 conducts expelled exhaust gasses 99 to a turbocharger 65 from which exhaust gasses 99 are expelled, such as to the atmosphere.

An air supply system 40 supplies combustion air to cylinder 12. Air supply system 40 generally includes a naturally aspirated air intake system 41 for supplying aspirated air 42 to cylinder 12 and a charged air intake system 60 for supplying charged air 62 to cylinder 12. Charged air 62 is at greater than ambient pressure.

Naturally aspirated air intake system 40 generally includes intake port 55, an aspirated air passage 57 for conducting aspirated air 42 to intake port 55, and valve means 49 for opening and closing port 55 and thereby controlling passage of aspirated air 42 through port 55. Valve means 49 includes aspirated air valve 50 and means, such as cam 51, for operating valve 50. Aspirated air passage 57 includes a first end 58 positioned for receiving non-charged air, such as air from an air cleaner or atmospheric air 43 and a second end 59 in communication with port 55.

A throttle valve 36 located in aspirated air passage 57 upstream of fuel injector 24A and controlled by means well-known in the art, such as throttle controller 35, regulates air flow through passage 57.

Charged air intake system 60 generally comprises charged air intake port 75, a supercharger 64, such as mechanically-driven supercharger or turbine- driven turbocharger 65, for drawing in and charging air, a charged air passage 77 communicating charged air 62 from turbocharger 65 to charged air port 75, and valve means 69 for opening and closing port 75 and thereby controlling passage of charged air 62 through port 75. Valve means 69 includes charged air valve 70 and means, such as cam 71, for operating valve 70.

Charged air passage 77 includes a first end 78 positioned for receiving charged air 62 from turbocharger 65 and a second end 79 in communication with port 75.

Turbocharger 65 generally comprises a turbine 66 and a compressor 67. As is well-known in the art, exhaust gases 99 discharged from combustion chamber 17 through exhaust port 95 flow through exhaust passage 98 to turbine 66 to turn turbine 66 before exiting. Turbine 66 drives compressor 67 that draws in air, typically ambient air 43, such as through intake duct 58 through flow meter 28, compresses or charges the air, and expels the charged air 62 into passage 77. A mechanically-driven supercharger 64 may be used in place of turbocharger 65 as is known in the art. In which case compressor 67 would likely be a displacement type blower mechanically-driven, such as by a belt, by engine 10. As used herein, supercharger may mean either a conventional supercharger, or other air compression device.

Valve means 49, 69 and 89 open and close ports 55, 75 and 95, respectively. Each includes a valve 50, 70 or 90, respectively, adapted to cover ports 55, 75 and 95, and means, such as associated, properly shaped cams 51, 71 and 91, respectively, for operating valves 50, 70 and 90. Although conventional valves and cams are shown and described, other valve means, such as rotating ports and piston-exposed ports, and valve operating means are well-known and may be advantageously used. Cams 51, 71 and 91 are operated by an associated engine component, such as by a known crankshaft, not shown, in manners well-known in the art, in a timed sequence.

FIG. 2 is a graph depicting a preferred embodiment of the positions of exhaust valve 90, aspirated air intake valve 50, and charged intake valve 70 relative to position of piston 18. The legends "T.D.C." and "B.D.C." are abbreviations for piston positions at "Top Dead Center", i.e. the top of the stroke, and "Bottom Dead Center", i.e. at the bottom of the stroke.

Exhaust valve 90 begins opening at the end of the power stroke and remains open during the exhaust stroke as piston 18 minimizes combustion chamber 17 and drives exhaust gases out exhaust port 95. Exhaust port 95 is large to permit rapid egress of exhaust gases. Exhaust valve 90 closes when piston 18 reaches substantially 0°, i.e. top dead center.

Aspirated air valve 50 begins opening substantially at the closing of exhaust valve 90 and as piston 18 goes down so as to expand combustion chamber 17 and create a vacuum therein. Aspirated air valve 50 opens so as to fill combustion chamber 17 with aspirated non-charged air 42. Aspirated air valve 50 closes before combustion chamber 17 approaches maximum volume, that is before piston 18 reaches 180° so as to allow entry of charged air 62.

Charged air valve 70 opens substantially at the closing of aspirated air valve 50 so as to release charged air 62 through charged air port 75 into combustion chamber 17 and preferably remains open past bottom dead center (180°) until pressure in combustion chamber 17 approaches pressure of inducted charged air 62. The timings specified are approximate. For example, there may be some overlap where both the aspirated and non-aspirated valves are open simultaneously, as the intake air has inertial effects that slightly distort the theoretical valve timeings.

The design of the invention uses induction of a combination of naturally aspirated air 42 and charged air 62 to obtain the largest air mass in combustion chamber 17 and therefore the greatest compression. Maximum air mass may be dependent upon many factors including size of intake ducts, ports and valves; type and efficiency of supercharger; engine speed; and valve timing, i.e. opening and duration. Since, typically at low engine speeds the amount of charged air 62 may be limited by compressor efficiency, especially using a turbocharger, it is advantageous to use as much naturally aspirated air as possible. Piston displacement is related to the sine of the crank angle. Thus, the rate of gain in displacement decreases rapidly near 180° so little is gained by continuing to aspirate air during this range. In contrast, since on each side of 180° little change in displacement occurs over a long time period, charged air 62 may be inducted with little diminution of aspirated air. By the time crank angle reaches 90°, 50% of piston displacement has occurred; by 120°, 75%; by 130°, 82%; by 140°, 88%; by 150°, 93%; and by 160°, 97%. The greater the amount of charged air 62 available, the sooner aspirated air valve 50 is closed and the sooner charged air valve 70 is opened. With a mechanically-driven displacement blower, the inducted air mass will likely be maximized with charged air valve open between about 120° and 150°. With a turbine-driven compressor, at low engine speeds where the compressor is less efficient, the inducted air mass is maximized by opening charged air valve 70 later, and at higher engine speeds and higher turbine compressor efficiency, the inducted air mass will maximized by opening charged air valve 70 earlier. An advance mechanism, not shown but as is known in the art, may be used to change valve timing. In this manner, exhaust gas volume is greatly increased, even at lower speeds, and may typically approach 300% or more the aspirated air intake volume of a non-charged engine.

Charged air valve 70 closes when the pressure in combustion chamber 17 approaches that of charged air 62. This would typically be after bottom dead center. The greater the air mass introduced, typically the sooner after bottom dead center charged air valve 70 should close.

The engine 10 shown and described takes advantage of normally aspirated air so that only the boost air portion need be supplied. This reduces work required from the supercharger, greatly diminishes turbo lag and increases supercharger efficiency.

Although the foregoing description of the present invention has been directed to a single cylinder turbocharged engine, it may apply to any multi-cylinder supercharged engine. Although a single naturally aspirated port and a single charged air port is shown, there can be one or more of such ports. Thus, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. An internal combustion engine comprising:
   a cylinder including:
     a combustion chamber;
   a piston movable in said cylinder so as to vary the volume of said combustion chamber;
   an exhaust system: for removing combustion gases from said cylinder including:
     an exhaust port in said cylinder; and
   an air supply system for supplying combustion air to said cylinder comprising:
     a naturally aspirated air intake system for supplying non-charged air to said cylinder comprising:
       a naturally aspirated air intake port in said cylinder;

a valve controlling passage of air through said naturally aspirated air intake port; and
an aspirated air passage including:
a first end positioned for receiving noncharged air; and
a second end in communication with said aspirated air intake port; and
a charged air intake system for supplying charged air to said cylinder comprising:
a charged air intake port in said cylinder;
a valve controlling passage of air through said charged air intake port;
a supercharger powered by said engine for drawing in and charging air; and
a charged air passage communicating charged air from said supercharger to said charged air intake port.

2. The engine of claim 1 wherein:
said piston reciprocates in said cylinder.

3. The engine of claim 1 wherein said exhaust system further includes:
exhaust port operating means for operating said exhaust port including closing and opening said port.

4. The engine of claim 3 wherein:
said exhaust port operating means includes a valve; and
exhaust valve operating means for opening and closing said port with said valve.

5. The engine of claim 1 wherein:
said naturally aspirated air intake system includes:
aspirated air valve operating means for opening said aspirated air valve so as to fill said combustion chamber with non-charged air as said piston increases the volume of combustion chamber.

6. The engine of claim 5 wherein:
said aspirated air valve operating means closes said aspirated air valve before displacement of said piston reaches 93% maximum displacement.

7. The engine of claim 5 wherein:
said aspirated air valve operating means closes said aspirated air valve before displacement of said piston reaches 88% maximum displacement.

8. The engine of claim 5 wherein:
said aspirated air valve operating means closes said aspirated air valve before displacement of said piston reaches 82% maximum displacement.

9. The engine of claim 5 wherein:
said aspirated air valve operating means closes said aspirated air valve before displacement of said piston reaches 75% maximum displacement.

10. The engine of claim 1 wherein:
said charged air intake system includes:
charged air valve operating means for opening said charged air valve so as to release charged air into said combustion chamber.

11. The engine of claim 10 wherein:
said charged air valve operating means opens said charged air valve substantially upon closure of said aspirated air valve.

12. The engine of claim 10 wherein:
said charged air valve operating means closes said charged air valve after said piston has reached maximum displacement.

13. The engine of claim 12 wherein:
said charged air valve operating means opens said charged air valve substantially upon closure of said aspirated air valve.

14. The engine of claim 1 wherein:
said supercharger includes:
a turbine driven by exhaust gases from said engine.

15. The engine of claim 1 wherein:
said supercharger includes:
a displacement compressor mechanically driven by said engine.

16. An internal combustion engine comprising:
a cylinder including:
a combustion chamber;
a piston adapted for reciprocating in said cylinder so as to vary the volume of said combustion chamber;
an exhaust system for removing combustion gases from said cylinder including:
an exhaust port in said cylinder; and
an air supply system for supplying combustion air to said cylinder comprising:
a naturally aspirated air intake system for supplying non-charged air to said cylinder comprising:
a naturally aspirated air intake port in said cylinder;
a valve controlling passage of air through said naturally aspirated air intake port;
aspirated air valve operating means for opening said aspirated air valve so as to fill said combustion chamber with noncharged air as said piston increases the volume of combustion chamber; and
an aspirated air passage including:
a first end positioned for receiving non-charged air; and
a second end in communication with said aspirated air input port; and
a charged air intake system for supplying charged air to said cylinder comprising:
a charged air intake port in said cylinder;
a valve controlling passage of air through said charged air intake port;
a supercharger powered by said engine for drawing in and charging air;
a charged air passage communicating charged air from said supercharger to said charged air intake port; and
charged air valve operating means for opening said charged air valve so as to release charged air into said combustion chamber.

17. The engine of claim 16 wherein:
said charged air valve operating means opens said charged air valve substantially upon closure of said aspirated air valve.

18. The engine of claim 16 wherein:
said charged air valve operating means closes said charged air valve after said piston has reached maximum displacement.

19. The engine of claim 18 wherein:
said charged air valve operating means opens said charged air valve substantially upon closure of said aspirated air valve.

20. The engine of claim 16 wherein:
said aspirated air valve operating means closes said aspirated air valve before displacement of said piston reaches 93% maximum displacement.

\* \* \* \* \*